Feb. 28, 1939.  F. J. BRUMME  2,149,131
COOKING DEVICE AND METHOD
Filed March 20, 1937  2 Sheets-Sheet 2

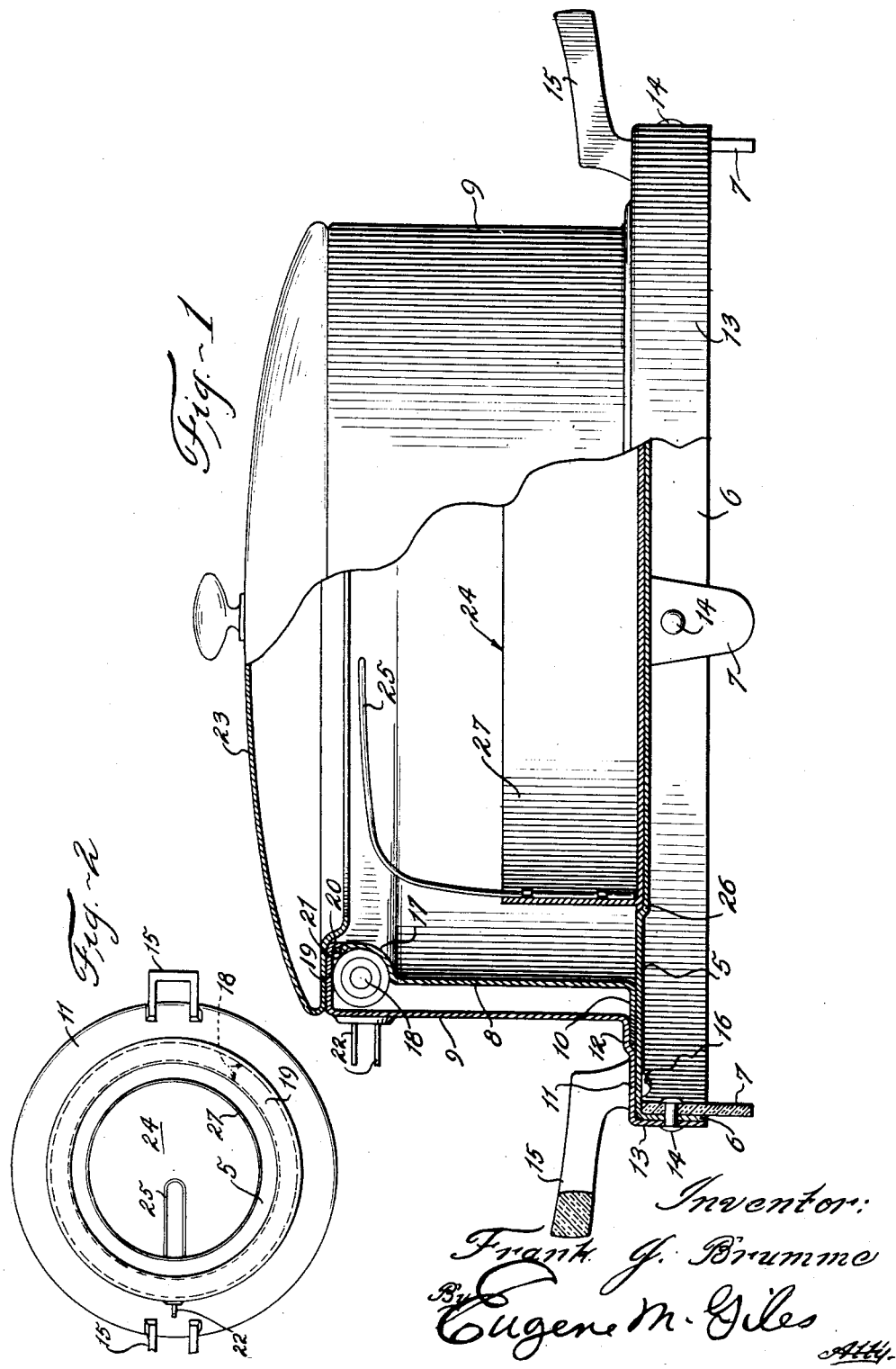

Patented Feb. 28, 1939

2,149,131

UNITED STATES PATENT OFFICE 2,149,131

COOKING DEVICE AND METHOD

Frank J. Brumme, Chicago, Ill.

Application March 20, 1937, Serial No. 132,049

17 Claims. (Cl. 219—43)

My invention relates to cooking devices especially of the electrically heated type and has reference more particularly to a structure and method wherein the heat is applied annularly around the top of a compartment so that cooking is effected therein by radiation of heat from the top of the compartment and conduction of heat from the top of the compartment to the bottom thereof.

The principal objects of the invention are to provide an improved device of electrically heated type for baking and similar purposes; to accomplish the cooking by an electrical heating unit around the top of the compartment; to insure proper distribution of the heat for uniform cooking or baking; and in general to provide a simple, convenient and effective cooking device and method particularly adapted for baking and which may be advantageously employed in small baking units of the portable type,—these and other objects being accomplished as described hereinafter and as shown in the accompanying drawings in which:

Fig. 1 is a side view, with parts broken away, of one form of baking device embodying my improvements;

Fig. 2 is a top view of the baking device of Fig. 1 with the cover removed;

Figure 4:
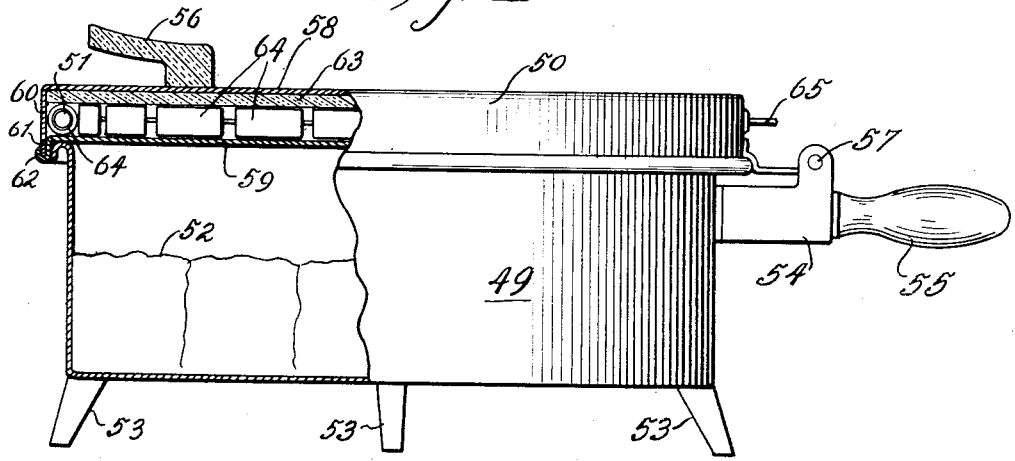
Fig. 4 is a similar view of a third form of baking device embodying my improvements.

Referring first to Figs. 1 and 2 of the drawings wherein I have represented for purposes of illustration one preferred embodiment of the invention, the reference numeral 5 indicates the bottom of the device which is of metal in the form of a plate with downturned marginal flange 6 to which are secured at intervals therearound a number of fibre legs 7 for supporting the baking device in a heat insulating manner. A wall, preferably hollow as shown extends upwardly from the bottom 5 to form the baking compartment and this wall consists of the spaced inner and outer shells 8 and 9 of metal, the former of which is provided at the bottom with an outturned marginal flange 10 resting on the bottom plate 5. The outer shell 9 also has a outturned flange at the bottom which is indicated at 11 and offset as at 12 to accommodate the marginal edge of the other flange 10 and this outer shell 9 may be secured to the bottom plate 5 in any convenient manner.

In the structure of Figs. 1 and 2 the flange 11 extends out to the margin of the bottom plate 5 and has a downturned rim 13 within which the bottom plate 5 is telescoped as shown and secured by rivets 14 which are passed through said rim 13 and the flange 6 of the bottom plate 5 and serve also to attach the fibre legs 7. Handles 15 are preferably attached to the device at opposite sides thereof by screws 16 passed through the bottom plate 5 and the flange 11 and engaged in the handles, the relation of the parts being such that when the bottom plate is telescoped within and secured to the rim 13 of the outer shell 9 and the handles 15 attached, the inner shell 8 is firmly clamped in place against the bottom plate 5 by the engagement of the offset portion 12 of the flange 11 against the margin of the flange 10 of the inner shell.

Provision is made around the top of the double wall 8—9 to accommodate a heating element and to this end the inner shell 8 is formed around the top with an offset 17 forming an annular seat for an electrical heating element 18 which extends around the top of the baking device. The outer shell 9 which projects up to the top of the heating element, has an inturned flange 19 overlying the heating element and closing the space between the shells 8 and 9 and this flange has a downturned margin 20 along the inner edge overlapping the upper margin of the shell 8, the latter margin being preferably offset as indicated at 21 to insure a smooth overlap.

The heating element 18 has the usual terminals for detachable connection of an electrical conductor thereto to supply current to the heating element and these terminals, which are indicated at 22, project outwardly in an insulated manner through the side wall of the shell 9 and are adapted for connection with the usual fitting commonly employed for detachably connecting a twin conductor cord to portable electrical devices of the household type.

In assembling this baking device, it will be understood that the heating element is merely placed within the upper end of the shell 9 and the terminals 22 thereof properly applied through the side wall thereof after which the inner shell is inserted in place and upon securing the bottom plate 5 to the assembled shells 8 and 9 the parts are thereby securely locked in place. Obviously by providing suitable lengths of flexible conductors between the ends of the heating element 18 and the respective terminals 22, the heating element may be first placed in the seat 17 of the shell 8 and after the terminals 22 have been mounted on the side wall of the shell 9 and connected by such flexible conductors with the ends of the heating element, the outer shell 9 may be applied around the shell 8 on which the heating element has been preliminarily mounted.

A cover 23, preferably of metal is provided which rests on the top flange 16 of the outer shell 9 for closing the baking compartment and a pan 24 is also provided for articles to be baked. This pan preferably has a handle 25 for convenience in removing the pan from the baking compartment and replacing same therein.

This pan 24 is of substantially smaller diameter than the compartment of the baking device and as it is desirable in the baking operation that the pan be located substantially concentrically in the compartment, the bottom plate 5 of the baking device is preferably recessed as at 26 throughout an area to accommodate the pan so that the latter may be readily located in the proper position in the compartment. Other means may of course, be provided for this purpose.

It will be noted that with the construction above described wherein the wall of the inner shell is offset at 17 to provide a seat for the heating element, said element and its seating wall, both of which extend around the compartment, overhang the compartment in a manner to direct radiated heat therefrom inwardly and downwardly into the compartment and toward the wall 27 of the pan 24 therein while at the same time heat is conducted from the heating element through the wall 8 to the bottom 5 of the compartment and therefrom to the pan 24 thereon. The pan wall 27 should terminate a sufficient distance below the heating element to avoid excessive heating of the said pan wall and to permit exposure of the contents of the pan to the radiated heat from the heating element, the elevation of the pan side wall and distance thereof from the heating element being quite important as the pan side wall supplements the heat communication that occurs through the side wall and bottom of the compartment to the pan and by making the pan side wall of suitable height to properly supplement the heat conducted through the compartment side wall and bottom, even distribution or balancing of heat for proper cooking is assured.

With the above construction, although a single heating element is employed, proper distribution of heat, uniform baking and a desirable browning of the pan contents is assured and possibility of overheating or burning at the bottom of the pan is practically eliminated.

Figure 3:
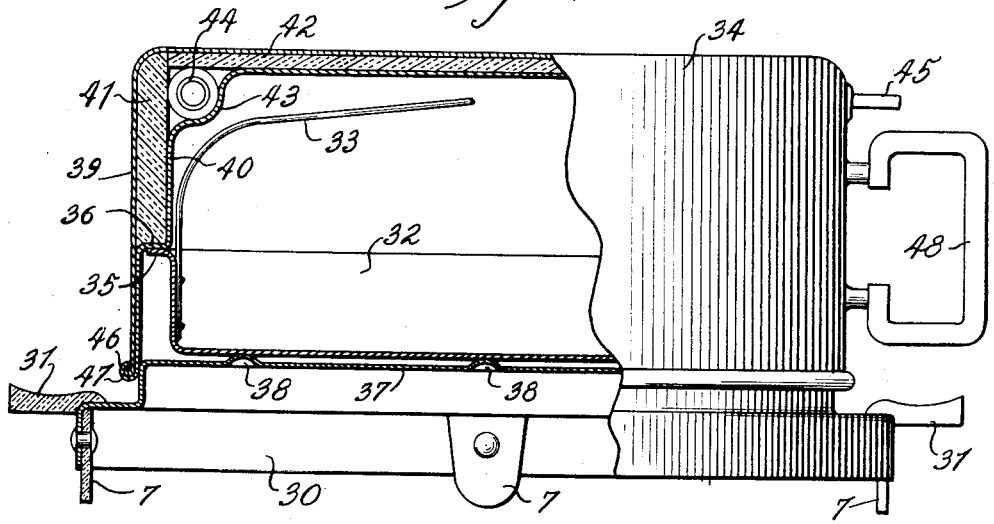
Fig. 3 is a side view, with parts broken away, of a modified form of device constructed in accordance with this invention.

Referring now to the second embodiment of my invention represented in Fig. 3, it will be seen that this device is similar in many respects to that of Figs. 1 and 2 which has just been described. It comprises a base 30 provided with insulating legs 7 and handles 31, an inner baking pan 32, preferably with a handle 33, adapted to rest upon this base, and a cover 34 of inverted pan like form cooperating with the base to provide an enclosure for the baking pan 32 on the base, said pan 32 being formed with an outturned annular flange or rim 35 around the top of the side wall thereof and the side wall of the cover 34 having an internal shoulder 36 which engages and supports the cover on the top flange 35 of the baking pan. The lower edge of the cover side wall may have any suitable engagement with the base 30 to close the baking compartment, said base in the illustrated structure being formed for this purpose with a raised deck 37 upon which the baking pan 32 is supported and which is closely embraced by the lower margin of the cover 34 when the latter is placed in position over the baking pan 32 on the base 30. This base which may be of sheet metal is provided with struck up dome formations 38 at suitable locations throughout the top of the deck 37 to support the pan 32 at a slight elevation thereabove and minimize dissipation of heat from the pan to the base.

For heating the compartment an electrical heating element is arranged annularly around the top of the cover 34 so as to communicate heat through the cover side wall to the pan 32 on which the cover rests and at the same time radiate heat from the element and top wall of the cover to the pan contents. Preferably the cover is made with a plain outer shell 39 which has an inner shell 40 telescoped therein, the latter being formed with the offset 36 which rests upon the rim 35 of the baking pan and provides thereabove a spacing of the side walls of the shells 39 and 40 to accommodate insulation 41 therebetween. Insulation 42 is also interposed between the top walls of the shells 39 and 40, the latter of which is formed at the juncture of the top and side wall thereof with an annular seat 43 for the electrical heating element 44 which is held in place thereon by the insulation 41 and 42. This heating element 44, which of course, is of insulated construction, has the usual terminals 45 projecting outwardly in an insulated manner through the side wall of the outer shell 39 for detachable connection of electrical conductors for supplying current thereto.

For securing the shells 39 and 40 together, the latter shell has a rolled edge 46 upon which the lower edge of the inner shell 40 is crimped somewhat as shown at 47 to provide a sealed connection permitting washing of the cover without water entering between the shells. A handle 48 of fibre or the like is provided for convenience in removing and replacing the cover 34 which, it will be understood, may be inverted and placed on the base 30 with the open side up and used as a pan within which food may be cooked by heat furnished by the heating element which is then around the bottom of the pan. Moreover, it will also be understood that this device may be used as an oven without the pan 32 in which case the cover 34 rests directly on the base in embracing engagement with the raised deck 37.

In operation of the baking device of Fig. 3, heat from the annular element 44 is transmitted to the top and side walls of the inner shell 40 and radiated therefrom inwardly and downwardly into the space occupied by the baking pan 32. At the same time heat from the annular element is conducted through the side wall of the shell 40 to the offset portion 36 thereof which rests upon the baking pan rim 35 and by its contact with said rim, communicates heat to the side wall and bottom of the pan 32. The heated cover 34 may be readily removed from and replaced on the base 30 and when removed the baking pan 32 is completely exposed and may be removed from and replaced on the base 30 at will.

In the embodiment of my invention represented in Fig. 4, the device comprises a pan like member 49 and a cover 50 therefor with the electrical heating element 51 arranged annularly around the marginal edge of the cover where the latter engages the rim of the pan like member, the pan like member being preferably employed as the container for the articles to be cooked, as indicated at 52 in Fig. 4, without a separate pan for the purpose as provided in the structures heretofore described.

Legs 53, preferably of heat insulating material are provided at the bottom of the pan member 49 which has a handle fitting 54 at one side to which a handle 55 is attached and the cover, which has a handle 56 on the top thereof, is hinged to the handle fitting 54 as indicated at 57 so as to close snugly against the rim of the pan member, said cover having a depending margin which embraces the rim of the pan member, as shown, when the cover is closed down thereagainst.

This cover 50 comprises spaced upper and lower plates 58 and 59 with depending marginal flanges 60 and 61 respectively, the lower plate being telescoped within the marginal flange 60 of the upper plate and secured therein by the rolled edge connection 62 similar to that employed at 46, 47 in the structure of Fig. 3. The under side of the top plate 58 is faced with a layer 63 of heat insulating material which extends over the annular heating element 51 which may correspond to that shown in Figs. 1, 2 and 3 or may be of the modified form indicated in Fig. 4 wherein the insulation thereof comprises sections 64 of porcelain or other refractory insulation. The terminals 65 of said element project in an insulated manner through the depending flange 60 of the top plate 58 for detachable connection of electrical conductors for supplying current thereto.

The operation of the apparatus of Fig. 4 is basically the same as is that of the previously described devices. Heat from the element 51 is transmitted to the lower plate 59 of the cover and by it radiated downwardly into the baking compartment therebeneath. At the same time heat is also conducted from the rim of said plate to the upper edge of the side wall of the pan member 49 and therefrom throughout said side wall and to the bottom of the pan member 49.

From the foregoing, it will be seen that all modifications of my invention illustrated and described herein function to cook articles by the novel and advantageous method of enclosing the articles in a compartment and exposing them simultaneously to overhead radiated heat originating in an annular zone around the compartment top and also to side and bottom heat conducted from the same zone through the compartment walls.

While I have shown and described my invention in a preferred form, I am aware that various changes and modifications may be made therein without departing from the principles of my invention, the scope of which is to be determined by the appended claims.

I claim as my invention:

1. In a cooking device of the class described, the combination of a casing with a compartment therein, and a heating element arranged annularly around the top of the compartment, said casing having a bottom and side wall of heat conducting material and a top wall, said heating element being peripherally localized in the compartment substantially at the juncture of the top and side walls and in direct heat conducting relation to the latter wall.

2. In a cooking device of the class described, the combination of a casing with a compartment therein, and a heating element arranged annularly around the top of the compartment, said casing being provided with a top wall and having a bottom wall of heat conducting material and a side wall of heat conducting material interposed between and in heat conducting relation to the heating element and the bottom wall for conducting heat from said element to the bottom wall, said element being localized substantially at the juncture of the top and side walls and in direct heat conducting relation to the latter wall.

3. In a cooking device of the class described, the combination of a casing having a compartment therein with a surrounding side wall, and a heating element arranged annularly around the top of the compartment built into the upper margin of said side wall.

4. In a cooking device of the class described, the combination of a base, an annular wall extending upwardly from the base and comprising spaced inner and outer shells one of which is secured to and clamps the other shell upon the base, said inner shell having an annular portion around the top offset away from the outer shell to form an annular seat, and a heating element arranged annularly around the top of the compartment within said seat, said outer shell having an inturned flange overlying said heating element and overlapping the top margin of the inner shell.

5. In a cooking device of the class described, the combination of a two section casing with an annular wall and top and bottom walls providing a closed compartment within the casing, one of said sections being removable to afford access to the compartment, and a heating element which is arranged annularly around the compartment at the top and housed within one of said walls and localized at the juncture of said wall with one of the other walls.

6. In a cooking device of the class described, the combination of a casing having therein a compartment with a heating element arranged annularly around the top, said casing having a bottom wall with a side wall therearound at which the heating element is localized and through which heat is conducted from the heating element to the bottom wall, and said compartment having therein annular heat balancing means through which a supplementary supply of heat is transmitted to the bottom of the compartment.

7. In a cooking device of the class described, the combination of a casing with a compartment therein, said casing having an annular wall surrounding said compartment, a top wall, a removable pan within the compartment and provided with an upwardly extending peripheral wall spaced from the surrounding wall of the compartment, and a heating element arranged annularly around the top of the compartment above the wall of said pan and localized at the juncture of said wall with the top wall.

8. In a cooking device of the class described, the combination of a casing with a compartment therein, a heating element arranged annularly around the top and localized at the peripheral margin of the compartment, and a pan within the compartment, said compartment having a bottom wall upon which the pan is supported and means minimizing heat dissipation between the pan and bottom wall.

9. In a cooking device of the class described, the combination of a pan like member comprising a wall with an annular enclosure extending therearound at one side and forming a compartment to receive articles for cooking, and an annular heating element extending around the pan like member and localized peripherally of the compartment substantially at the juncture of the wall and enclosure.

10. In a cooking device of the class described, the combination of a pan like member comprising a wall with an annular enclosure extending therearound at one side and forming a compartment to receive articles for cooking, an annular heating element extending around the pan like member and localized peripherally of the compartment substantially at the juncture of the wall and enclosure, and a base cooperable with the open side of the pan like member to removably support said member thereon and close the open side thereof, said base having means interengaging with the aforesaid enclosure of the pan like member to hold the latter thereon.

11. In a cooking device of the class described, the combination of a pan, a base on which the pan is removably supported, a pan like member supported in an inverted position by said pan and having an annular wall extending downwardly around the pan to the base, and an annular heating element localized at the annular wall of and extending around the top of said member above the pan.

12. In a cooking device of the class described, the combination of a pan, with a surrounding side wall, a base upon which the pan is removably supported, an inverted pan like member having a depending annular wall extending downwardly around the pan to the base, said annular wall having an internal shoulder resting on the top rim of the pan side wall, and an annular heating element extending around said member above the shoulder and localized at the annular wall of the pan like member.

13. In a cooking device of the class described, the combination of a metal pan with an upwardly extending annular side wall and a pan cover having a separable heat conducting engagement with the upper margin of the pan side wall, said cover being provided with an annular heating element localized at the upper margin of the pan side wall.

14. The method of cooking articles which comprises placing the articles at the bottom of a compartment, restricting the production of heat to an annular zone around the top of the compartment at the periphery thereof and conducting such produced heat through the side walls of the compartment to the bottom thereof and from the latter to the articles.

15. The method of cooking articles which comprises enclosing the articles in a compartment, exposing the articles to overhead radiated heat restrictively originated in an annular zone around the top of the compartment at the periphery thereof and simultaneously conducting heat from said zone through the side walls of the compartment to the bottom wall thereof and from the latter wall to the articles.

16. The method of heating the interior of a cooking compartment which comprises restrictively originating the utilized heat in an annular zone around the top of the compartment at the periphery thereof and conducting heat from said zone through the top, side and bottom walls of said compartment.

17. The method of heating the interior of a cooking compartment which comprises restrictively originating heat in an annular zone around the top of the compartment at the periphery thereof and radiating heat therefrom into the compartment and simultaneously conducting heat from said zone through the top, side and bottom walls of said compartment.

FRANK J. BRUMME.